US006175675B1

(12) United States Patent
Lee et al.

(10) Patent No.: US 6,175,675 B1
(45) Date of Patent: Jan. 16, 2001

(54) APPARATUS FOR ALIGNING AND METHOD OF BONDING OPTICAL WAVEGUIDE DEVICE TO OPTICAL FIBER BLOCK

(75) Inventors: Yeong-gyu Lee, Suwon; Hyung-seung Song, Yongin; Hyoun-soo Kim, Sungnam, all of (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/390,632

(22) Filed: Sep. 7, 1999

(30) Foreign Application Priority Data

Sep. 14, 1998 (KR) .................................................. 98-37766

(51) Int. Cl.$^7$ ...................................................... G02B 6/26
(52) U.S. Cl. ................................................................ 385/50
(58) Field of Search ................................... 385/49.5, 129, 385/147, 88–90

(56) References Cited

U.S. PATENT DOCUMENTS

| 5,544,268 | * | 8/1996 | Deacon et al. | 385/15 |
| 5,559,915 | | 9/1996 | Deveau | 385/49 |
| 5,581,642 | * | 12/1996 | Deacon et al. | 385/129 |
| 5,630,004 | * | 5/1997 | Bischel | 385/4 |
| 5,664,032 | * | 9/1997 | Yuhara et al. | 385/90 |
| 5,677,973 | * | 10/1997 | Deacon et al. | 385/27 |
| 5,748,825 | * | 5/1998 | Rockwell | 385/126 |

* cited by examiner

*Primary Examiner*—Akm E. Ullah
(74) *Attorney, Agent, or Firm*—Robert E. Bushnell, Esq.

(57) ABSTRACT

An apparatus for aligning an optical waveguide device has functional waveguides for transmitting signal light and internal and external waveguides, located on the periphery of the functional waveguides, with optical fiber blocks and includes an optical source, a first optical fiber block having a plurality of first functional optical fibers each connected to one end of each of the functional waveguides, and a plurality of first alignment optical fibers each aligned with one end of each of the internal and external waveguides for transmitting light generated by the optical source, a second optical fiber block having a plurality of second functional optical fibers each connected to the other end of each of the functional waveguides, and a plurality of second alignment optical fibers each aligned with the other end of each of the internal and external waveguides, a measuring unit for measuring an intensity of light output from the second alignment optical fibers, and a controller for receiving the intensity of light from the measuring unit and finely adjusting the alignment of the first optical fiber block with the optical waveguide device and the optical waveguide device with the second optical fiber block in order to maximize the received intensity of light. A waveguide-type optical device can be aligned with optical fiber blocks regardless of the wavelength, by using input and output alignment optical fibers and internal and external bending waveguides in the optical device. Therefore, there is no need to know accurately the wavelength properties of an individual device.

7 Claims, 4 Drawing Sheets

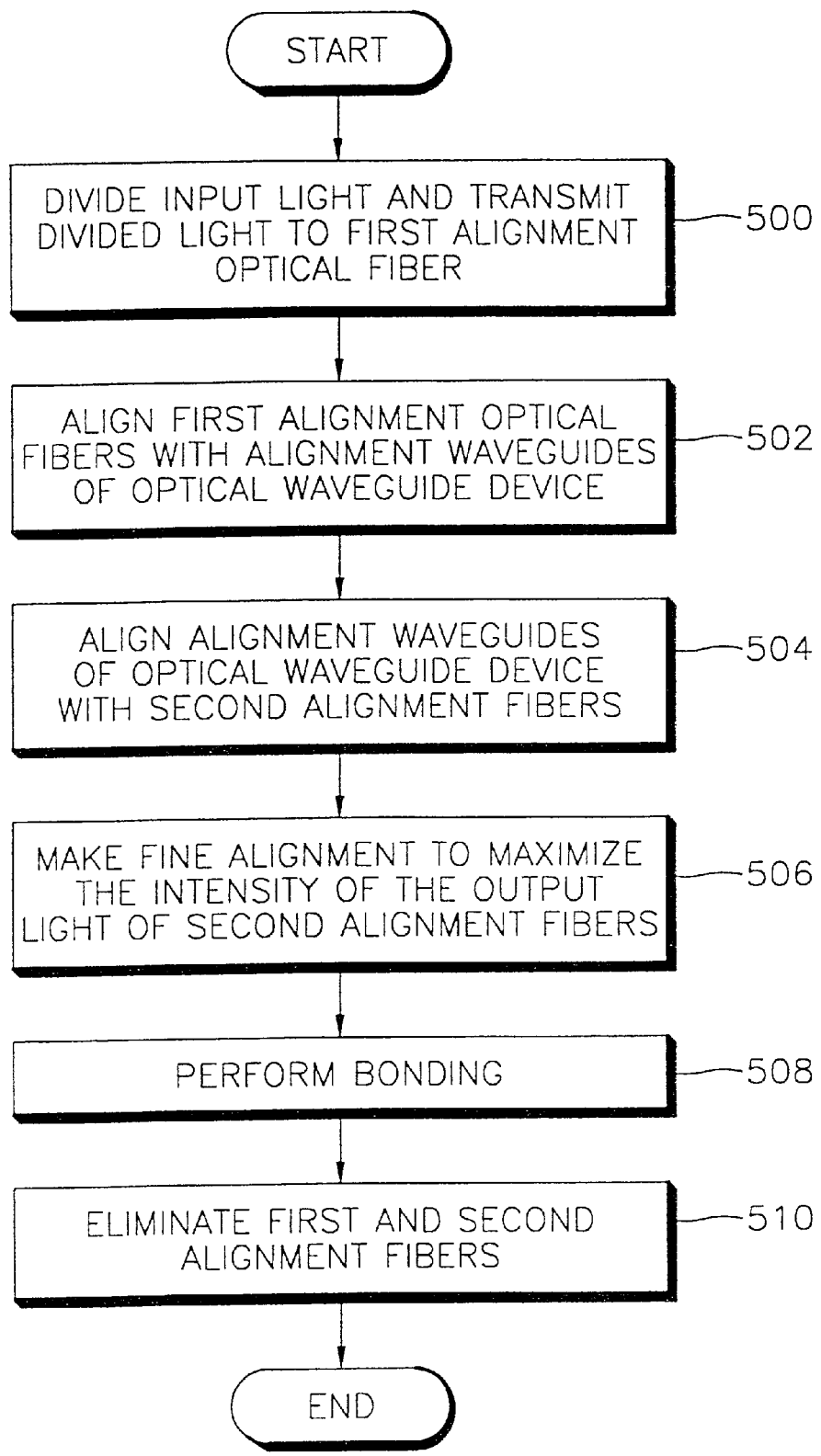

APPARATUS FOR ALIGNING AND METHOD OF BONDING OPTICAL WAVEGUIDE DEVICE TO OPTICAL FIBER BLOCK

CLAIM OF PRIORITY

This application makes reference to, incorporates the same herein, and claims all benefits accruing under 35 U.S.C. §119 from my application APPARATUS FOR ALIGNING AND METHOD OF BONDING OPTICAL WAVEGUIDE DEVICE TO OPTICAL FIBER BLOCK filed with the Korean Industrial Property Office on Sep. 14, 1998 and there duly assigned Serial No. 37766/1998.

BACKGROUND OF THE INVENTION

1. Field of the Invention

The present invention relates to an apparatus and method of aligning an optical waveguide device with an optical fiber block, and more particularly, to an apparatus for aligning an optical waveguide device with an optical fiber block using internal and external bending waveguides included in the optical waveguide device, and a method of bonding the optical waveguide device to the optical fiber block.

2. Description of the Related Art

An optical device and an optical fiber must be aligned and bonded to each other in order for an optical waveguide device chip to be used in an optical network.

An earlier apparatus for aligning an optical waveguide device with optical fiber blocks includes an input optical fiber block on which an optical fiber is mounted, an optical waveguide device having an input optical waveguide and an output optical waveguide, and an output optical fiber block on which optical fibers are mounted. In the alignment and bonding according to such a configuration, first, light is incident upon the optical fiber on the input optical fiber block, and the optical fiber is aligned with the input waveguide of the optical waveguide device. Then, the output waveguide of the optical waveguide device is aligned with the optical fibers on the output optical fiber block, such that light is guided. The intensity of light output through the two outermost ports in the optical fibers is detected. The positions of the input and output optical fiber blocks and the optical waveguide device are finely adjusted in order to detect the maximum intensity of the output light. After the positions are determined, the input and output optical fiber blocks and the optical waveguide device are bonded to one another by the epoxy.

However, an optical waveguide device such as an optical wavelength multiplexer has wavelength characteristics, such that an optimal position satisfying both the fine-tuned alignment and wavelength characteristics must be determined to align and bond such an optical waveguide device to optical fiber blocks.

Since this optical waveguide device can have different wavelength characteristics for each manufactured chip, accurate wavelength characteristics must be recognized before alignment and bonding are performed. Accordingly, many complicated apparatuses, such as a plurality of optical sources, are required.

SUMMARY OF THE INVENTION

It is an object of the present invention to provide an apparatus for aligning an optical waveguide device with optical fiber blocks, by which alignment not considering the wavelength of signal light is accomplished not using function waveguides for transmitting signal light but rather using internal and external bending waveguides included in the optical waveguide device, and a method of bonding the optical waveguide device to the optical fiber block.

Accordingly, to achieve the above object, the present invention provides an apparatus for aligning an optical waveguide device having functional waveguides for transmitting signal light and internal and external waveguides located on the periphery of the functional waveguides, with optical fiber blocks, the apparatus including: an optical source; a first optical fiber block having a plurality of first functional optical fibers each connected to one ends of each of the functional waveguides, and a plurality of first alignment optical fibers each aligned with one end of each of the internal and external waveguides for transmitting light generated by the optical source; a second optical fiber block having a plurality of second functional optical fibers each connected to the other end of each of the functional waveguides, and a plurality of second alignment optical fibers each aligned with the other end of each of the internal and external waveguides; a measuring portion for measuring the intensity of light output from the second alignment optical fibers; and a controller for receiving an intensity of light from the measuring unit and finely adjusting the alignment of the first optical fiber block with the optical waveguide device and the optical waveguide device with the second optical fiber block in order to maximize the received intensity of light.

To achieve the above object, the present invention provides a method of bonding an optical waveguide device having functional waveguides for transmitting signal light and internal and external waveguides located on the periphery of the functional waveguides to optical fiber blocks, the method comprising the steps of:

dividing input light and transmitting divided light to first alignment optical fibers;

aligning each of the first alignment optical fibers with one end of each of the internal and external waveguides on the optical waveguide device;

finely adjusting the alignment of the other end of each of the internal and external waveguides with each of second alignment optical fibers so that an intensity of light to be output from the second alignment optical fibers becomes maximum; and bonding each first optical fiber for transmitting signal light to one end of each of the functional waveguides, and each second optical fiber for transmitting signal light output from the other end of each of the functional waveguides, to the other end of each of the functional waveguides.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein:

FIG. 5 is a flowchart illustrating a method of bonding an optical waveguide device to an optical fiber block, according to the present invention.

DESCRIPTION OF THE PREFERRED EMBODIMENT

Figure 1:
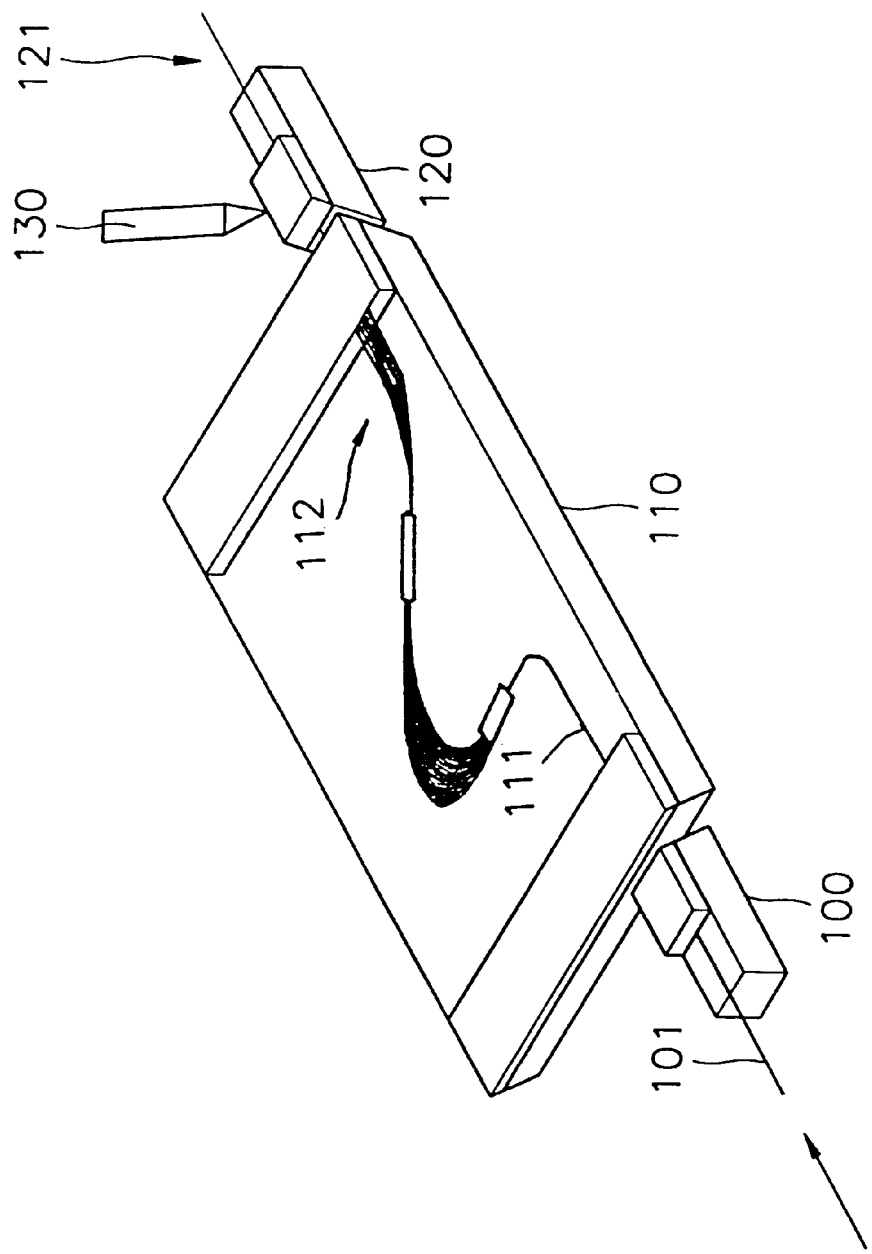
FIG. 1 is a perspective view of an apparatus for aligning an optical waveguide device with optical fiber blocks.

FIG. 1 is a perspective view showing the apparatus for aligning an optical waveguide device with optical fiber blocks as discussed in the Description of the Related Art above. The apparatus includes an input optical fiber block 100 on which an optical fiber 101 is mounted, an optical waveguide device 1 10 having an input optical waveguide 111 and an output optical waveguide 112, and an output optical fiber block 120 on which optical fibers 121 are mounted. An epoxy 130 is used to bond the optical waveguide device 110 to the output optical block 120.

Figure 2:
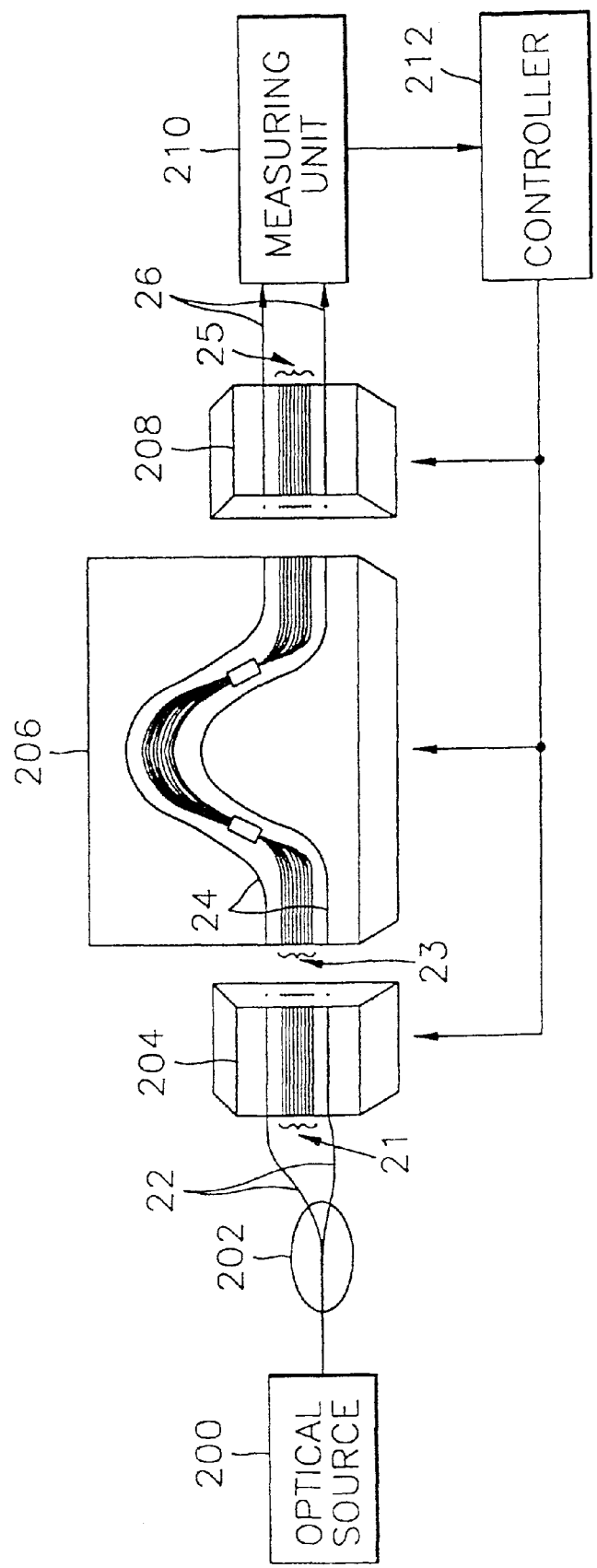
FIG. 2 is a configuration view of an apparatus for aligning an optical waveguide device with optical fiber blocks, according to the present invention.

Referring to FIG. 2 showing an apparatus for aligning an optical waveguide device with optical fiber blocks according to the present invention, the apparatus includes an optical source 200, an optical coupler 202, an input optical fiber block 204, an optical waveguide device 206, an output optical fiber block 208, a measuring unit 210, and a controller 212.

The optical coupler 202 divides light input from the optical source 200. The optical source 200 generates light of an arbitrary wavelength within a communications wavelength region.

The input optical fiber block 204 includes functional optical fibers 21 for transmitting signal light, and a plurality of alignment optical fibers 22 for transmitting light generated by the optical source 200. During alignment, the alignment optical fibers 22 are connected to the optical coupler 202. Here, typical optical fibers not ribboned or jumper-corded are used as the alignment optical fibers 22.

The optical waveguide device 206 includes functional optical waveguides 23 for transmitting signal light, and internal and external bending waveguides 24 connected to the alignment optical fibers of the input optical fiber block 204. Most optical waveguide devices include internal and external bending waveguides 24 to analyze the characteristics of an optical waveguide device chip. In the present invention, the internal and external bending waveguides 24 are used as alignment waveguides. That is, the optical waveguide device 206 is aligned with the input and output optical fiber blocks 204 and 208 using the internal and external bending waveguides 24. The optical waveguide device 206 can further include a plurality of bending or straight waveguide (not shown) in addition to the internal and external bending waveguides 24 as the alignment waveguides.

Upon alignment, one side of each of the internal and external bending waveguides (alignment waveguides) 24 is connected to each of the alignment optical fibers 22 of the input optical fiber block 204.

The output optical fiber block 208 includes functional optical fibers 25 for transmitting signal light, and a plurality of alignment optical fibers 26, similar to the input optical fiber block 204. During alignment, each of the alignment optical fibers 26 is connected to the other side of each of the internal and external bending waveguides (alignment waveguides) 24 of the optical waveguide device 206. Typical optical fibers not ribboned or jumper-corded are used as the alignment optical fibers 26, similar to that of the input optical fiber block 204.

The measuring portion 210 is connected to the alignment optical fibers 26 of the output optical fiber block 208, and measures the intensity of light output from alignment optical fibers 26.

The controller 212 controls the positions of the input optical fiber block 204, the optical waveguide device 206, and the output optical fiber block 208 to maximize the intensity of light measured by the measuring portion 210.

Figure 3:
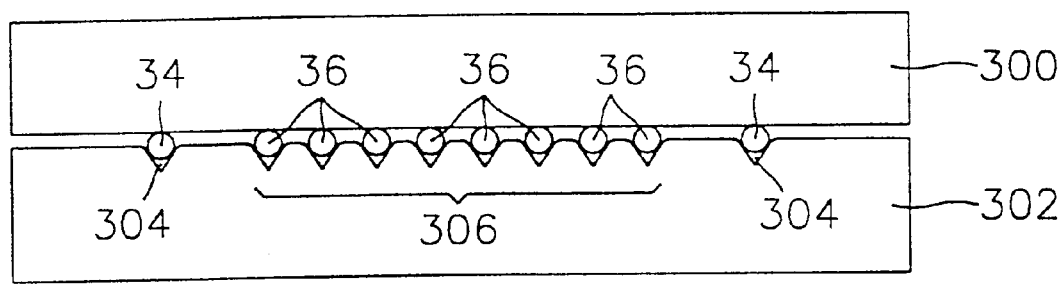
FIG. 3 is a cross-sectional view of the input optical fiber block shown in FIG. 2.

FIG. 3 shows a cross-section of the input optical fiber block 204 shown in FIG. 2. The optical fiber block in FIG. 3 includes an upper body 300 and a lower body 302. The lower body 302 includes V grooves 304 on which the alignment optical fibers 34 are mounted, and V grooves 306 on which the functional optical fibers 36 are mounted. The output optical fiber block 208 has the same structure as the input optical fiber block 202. The groove 304 on which the alignment optical fiber 34 is mounted can further include grooves (not shown) according to when the optical waveguide device further includes bending or straight waveguides in addition to the internal and external bending waveguides.

Figure 4:
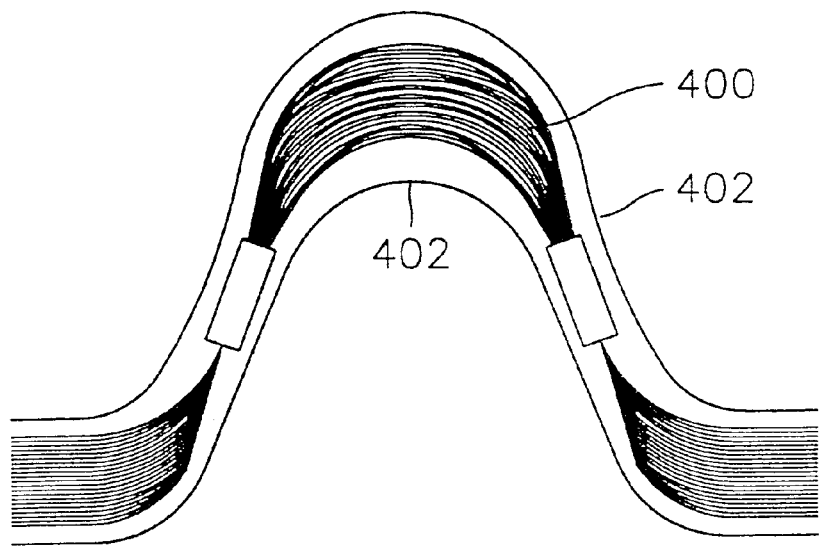
FIG. 4 is a,e illustrating an example of the optical waveguide device shown in FIG. 2.

FIG. 4 shows an example of the optical waveguide device 206 of FIG. 2. Reference numeral 400 represents an optical wavelength multiplexer acting as functional waveguides for transmitting signal light, and reference numeral 402 indicates alignment waveguides.

FIG. 5 is a flowchart illustrating a method of bonding an optical waveguide device to an optical fiber block, according to the present invention. The bonding method illustrated with reference to FIG. 5 includes an input light dividing step 500, a first alignment step 502, a second alignment step 504, a fine alignment step 506, a bonding step 508, and an alignment optical fiber removing step 510.

First, input light which has an arbitrary wavelength within a communications wavelength range; the light is divided by an optical coupler or the like. The divided light is transmitted to a plurality of first alignment optical fibers included in a first optical fiber block, in step 500. Each of the first alignment optical fibers is aligned with one side of each of alignment waveguides included in the optical waveguide device, in step 502. The other side of each of the alignment waveguides is aligned with each of a plurality of second alignment fibers included in a second optical fiber block, in step 504. The intensity of light output via the second alignment fibers is measured, and the alignment of the first optical fiber block, the optical waveguide device, and the second optical fiber block is finely adjusted such that light of maximum intensity is measured, in step 506. After alignment is completed, each first functional fiber of the first optical fiber block are bonded to one end of each of functional waveguides of the optical waveguide device by epoxy or the like, and the other end thereof is also bonded to each second functional fiber of the second optical fiber block by epoxy or the like, in step 508. The first and second functional optical fibers are included in the first and second optical fiber blocks, respectively, to transmit signal light. The functional waveguides are included in the optical waveguide device to transmit signal light. After bonding, the first and second alignment fibers are eliminated, in step 510.

According to the present invention, a waveguide-type optical device can be aligned with optical fiber blocks regardless of the wavelength, by using input and output alignment optical fibers and internal and external bending waveguides in the optical device, so that there is no need to accurately know the wavelength properties of an individual device. Therefore, easy and fast alignment and bonding can be made, and the constitution of equipment becomes simplified.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for aligning an optical waveguide device having functional waveguides for transmitting signal light and internal and external waveguides located on the periphery of the functional waveguides, with optical fiber blocks on which a plurality of optical fibers are mounted, the apparatus comprising:

an optical source;

a first optical fiber block having a plurality of first functional optical fibers each connected to one end of each of the functional waveguides, and a plurality of first alignment optical fibers each aligned with one end of each of the internal and external waveguides for transmitting light generated by the optical source;

a second optical fiber block having a plurality of second functional optical fibers each connected to the other end of each of the functional waveguides, and a plurality of second alignment optical fibers each aligned with the other end of each of the internal and external waveguides;

a measuring unit for measuring an intensity of light output from the second alignment optical fibers; and a controller for finely adjusting the alignment of the first optical fiber block with the optical waveguide device and the optical waveguide device with the second optical fiber block in order to maximize an intensity of light measured by the measuring unit.

2. The apparatus of claim 1, further comprising an optical coupler installed between the optical source and the first alignment optical fibers, for dividing light generated by the optical source and transmitting the divided light into the first alignment optical fibers.

3. The apparatus of claim 1, each of the first and second optical fiber blocks comprising a plurality of grooves on which the first and second functional optical fibers are mounted, and a plurality of grooves on which the first and second alignment optical fibers are mounted.

4. The apparatus of claim 3, the optical waveguide device further comprising a plurality of alignment waveguides.

5. The apparatus of claim 4, the first optical fiber block comprising a plurality of grooves on which a plurality of third alignment optical fibers, each to be connected to one end of each of the further comprised alignment waveguides, are mounted.

6. The apparatus of claim 5, the second optical fiber block comprising a plurality of grooves on which a plurality of fourth alignment optical fibers, each to be connected to the other end of each of the further comprised alignment waveguides, are mounted.

7. A method of bonding an optical waveguide device having functional waveguides for transmitting signal light and internal and external waveguides located on the periphery of the functional waveguides to optical fiber blocks, the method comprising the steps of:

dividing input light and transmitting divided light to first alignment optical fibers;

aligning each of the first alignment optical fibers with one end of each of the internal and external waveguides on the optical waveguide device;

finely adjusting the alignment of the other end of each of the internal and external waveguides with each of second alignment optical fibers so that an intensity of light output from the second alignment optical fibers is at a maximum; and bonding each first optical fiber for transmitting signal light to one end of each of the functional waveguides, and each second optical fiber for transmitting signal light output from the other end of each of the functional waveguides, to the other end of each of the functional waveguides.

* * * * *